(No Model.)
E. G. P. WERN.
FRICTION CLUTCH.
No. 505,338. Patented Sept. 19, 1893.
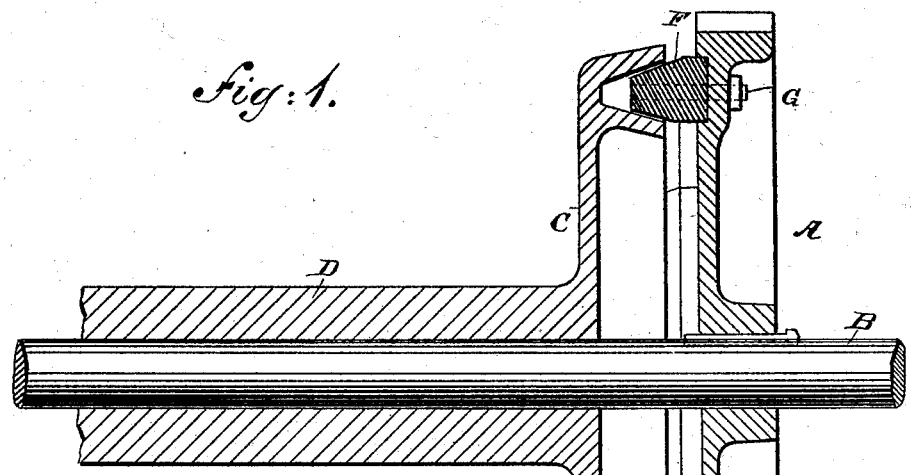
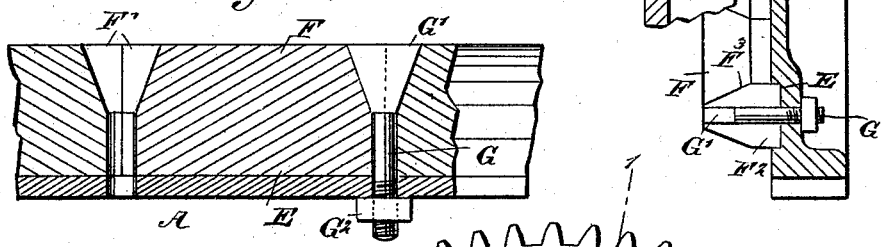
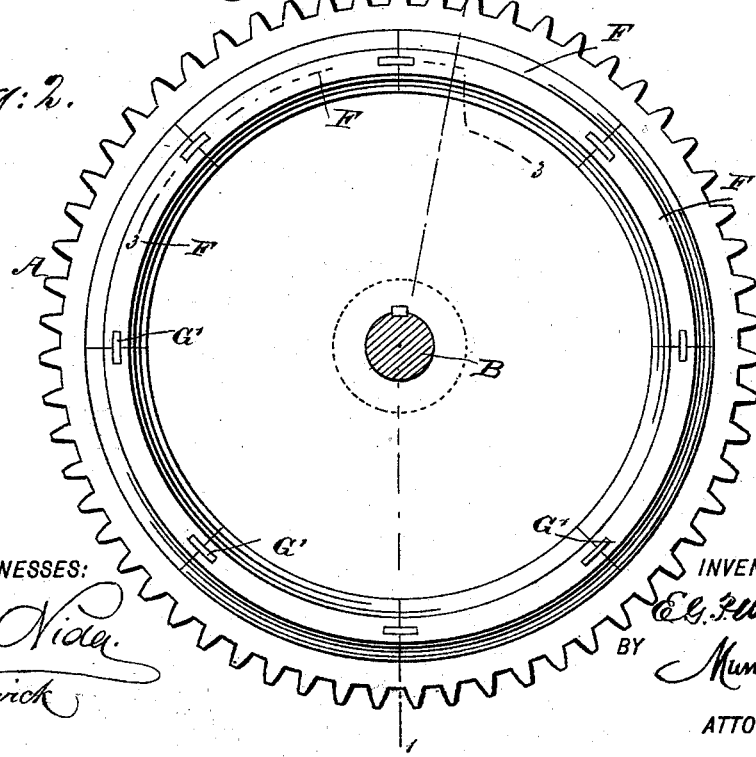
WITNESSES:
Chas. Nida.
C. Sedgwick.
INVENTOR
E. G. P. Wern
BY Munn & Co
ATTORNEYS.

UNITED STATES PATENT OFFICE.

ERIK GUSTAF PERSON WERN, OF BROOKLYN, NEW YORK.

FRICTION-CLUTCH.

SPECIFICATION forming part of Letters Patent No. 505,338, dated September 19, 1893.

Application filed January 31, 1893. Serial No. 460,317. (No model.)

*To all whom it may concern:*

Be it known that I, ERIK GUSTAF PERSON WERN, of Brooklyn, in the county of Kings and State of New York, have invented a new and Improved Friction-Clutch, of which the following is a full, clear, and exact description.

The invention relates to clutch wheels, and its object is to provide a new and improved friction wheel, which is simple and durable in construction, and arranged for presenting an even and well-wearing surface for frictional contact with the clutch wheel.

The invention consists of a wheel formed in one face with an annular groove, friction blocks set in the said groove to form a continuous friction rim, and bolts for fastening the said blocks in place on the wheel, each bolt being provided with a wedge-shaped head fitting into corresponding recesses at the joint of adjacent blocks.

The invention also consists of certain parts and details, and combinations of the same, as will be hereinafter described and claimed.

Reference is to be had to the accompanying drawings, forming a part of this specification, in which similar figures of reference indicate corresponding parts in all the figures.

Figure 1 is a sectional side elevation of the improvement and on the line 1—1 of Fig. 2. Fig. 2 is a face view of the improvement; and Fig. 3 is an enlarged sectional plan view of part of the improvement on the line 3—3 of Fig. 2.

The friction wheel A is secured in the usual manner on the shaft B, and is adapted to be thrown in frictional contact with the flange C of the hoisting drum D or other piece of machinery. The friction wheel A is formed in its web on one face with an annular recess E, in which are set a series of wooden blocks F, jointed together to form a continuous rim for frictional contact with a correspondingly-shaped groove in the clutch wheel C, as plainly shown in Fig. 1.

The blocks F are secured in place in their seats on the face of the wheel A by bolts G, one for each joint of two adjacent blocks, each of the said bolts being provided with a wedge-shaped head G' adapted to fit into correspondingly-shaped recesses F' formed in the ends of each block, so that two adjacent recesses F' of two adjacent blocks form a seat for the head G' of the bolt for the two adjacent blocks.

It will be seen that when the nut on the bolt is drawn up tight, the wedge-shaped head G' tends to draw the blocks F firmly into their seats in the recess E, so as to securely hold the blocks in position, and prevent outward as well as lateral, displacement, as by shrinking and splitting of blocks. Each of the blocks F, has the graining of its wood arranged cross-wise, so that the continuous rim formed by the several blocks, presents a hard-wearing surface for the frictional contact of the opposite clutch wheel C.

As illustrated in Fig. 1, each block has a square base $F^2$ and tapering sides $F^3$ extending outward from the base, a suitable distance from the face of the wheel A.

It will be seen that in case one of the blocks F should become worn out or injured, then it can be readily replaced by a new one, without disturbing the other blocks, it being only necessary to remove the two bolts at the ends of the injured block, then insert a new block and replace the bolts.

As illustrated in Fig. 2, the joints of adjacent blocks are arranged radially and the blocks are all of the same size so as to be interchangeable.

Having thus fully described my invention, I claim as new and desire to secure by Letters Patent—

1. A friction wheel, comprising a wheel formed in one face with an annular groove, friction blocks set in the said groove to form a continuous rim, and bolts for fastening the said blocks in place on the wheel, each bolt being provided with a wedge-shaped head fitting into corresponding recesses at the joint of adjacent blocks, substantially as shown and described.

2. A friction wheel, comprising a wheel formed in one face with an annular groove, friction blocks made of wood and set with their square bases into the said annular groove, the beveled sides of the said blocks forming a continuous rim for engagement with the friction clutch, and bolts for fastening the said blocks in place on the wheel, each bolt having a wedge-shaped head fitting into corresponding recesses at the joint of adjacent blocks, substantially as shown and described.

ERIK GUSTAF PERSON WERN.

Witnesses:
THEO. G. HOSTER,
C. SEDGWICK.